United States Patent
Maeda

(10) Patent No.: US 6,775,705 B2
(45) Date of Patent: Aug. 10, 2004

(54) IMAGE COMMUNICATION SYSTEM USING ELECTRONIC MAIL AND CONTROL METHOD THEREFOR

(75) Inventor: Toru Maeda, Mitaka (JP)

(73) Assignee: Canon Kabushiki Kaisha (JP)

( * ) Notice: Subject to any disclaimer, the term of this patent is extended or adjusted under 35 U.S.C. 154(b) by 34 days.

(21) Appl. No.: 09/130,925

(22) Filed: Aug. 6, 1998

(65) Prior Publication Data

US 2002/0059362 A1 May 16, 2002

(30) Foreign Application Priority Data

Aug. 21, 1997 (JP) .............................................. 9-240496

(51) Int. Cl.$^7$ .............................................. G06F 15/16
(52) U.S. Cl. ...................... 709/230; 709/228; 709/206; 358/402
(58) Field of Search ................................ 709/206, 200, 709/227, 230, 220, 228; 707/7, 10; 358/400, 401, 402

(56) References Cited

U.S. PATENT DOCUMENTS

| | | | | |
|---|---|---|---|---|
| 4,648,061 A | * | 3/1987 | Foster ......................... | 264/900 |
| 5,528,383 A | | 6/1996 | Tezuka et al. ............... | 358/435 |
| 5,530,740 A | * | 6/1996 | Irribarren et al. ............. | 379/89 |
| 5,737,395 A | * | 4/1998 | Irribarren ..................... | 379/88 |
| 5,905,495 A | * | 5/1999 | Tanaka et al. ............... | 345/335 |
| 6,023,700 A | * | 2/2000 | Owens et al. ................. | 707/10 |
| 6,025,931 A | * | 2/2000 | Bloomfield ................... | 358/402 |
| 6,134,017 A | * | 10/2000 | Schlank et al. ............. | 358/1.15 |
| 6,185,604 B1 | * | 2/2001 | Sekiguchi ................... | 709/206 |
| 6,211,972 B1 | * | 4/2001 | Okutomi et al. ............ | 358/402 |

FOREIGN PATENT DOCUMENTS

| | | |
|---|---|---|
| EP | 0 652 666 A1 | 5/1995 |
| EP | 0887994 A1 | 12/1998 |
| WO | 97/10668 | 3/1997 |
| WO | 97/22203 | 6/1997 |
| WO | 97/26753 | 7/1997 |

* cited by examiner

Primary Examiner—Dung C. Dinh
Assistant Examiner—Tod Kupstas
(74) Attorney, Agent, or Firm—Morgan & Finnegan, LLP

(57) ABSTRACT

An image communication system including electronic-mail apparatuses each having a function to add image-file processing information to an image file attached to an electronic mail. The image processing capability of each apparatus is examined in advance. In a transmitting-side apparatus, an image file is generated in accordance with the capability, and an electronic mail, to which the image file is attached, is transmitted to a receiving-side apparatus. Further, if the image file attached to the transmitted electronic mail cannot be processed by the receiving-side apparatus, the receiving-side apparatus notifies the transmitting-side apparatus of clarified cause of processing failure, further, transmits its image-file processing capability and the unprocessed transmitted electronic mail to the transmitting-side apparatus. Thus, efficient image-file transmission/reception can be performed.

23 Claims, 10 Drawing Sheets

FIG. 8

EXAMPLE OF IMAGE DESCRIPTION
FACSIMILE TRANSMISSION MESSAGE

| image / ITUFax |
| --- |
| MsgType = 0 |
| TxMsgID = 9708011030 |
| TxFaxNo = 03 - ???? - ???? |
| DIS = 00C200 |
| RxFaxNo = 06 - ??? - ???? |
| DIS = 00C200 |

FIG. 9

EXAMPLE OF IMAGE DESCRIPTION
CAPABILITY REQUEST MESSAGE

| image / ITUFax |
| --- |
| MsgType = 1 |
| TxMsgID = 9708010950 |
| TxFaxNo = 03 - ???? - ???? |
| DIS = 00C200 |

FIG. 10

EXAMPLE OF IMAGE DESCRIPTION
CAPABILITY RESPONSE MESSAGE

| image / ITUFax |
|---|
| MsgType = 2 |
| TxMsgID = 9708010950 |
| TxFaxNo = 03 - ???? - ???? |
| RxFaxNo = 06 - ??? - ???? |
| DIS = 00C200 |

FIG. 11

EXAMPLE OF IMAGE DESCRIPTION
IMAGE-PROCESSING CONFIRMATION MESSAGE

| image / ITUFax |
|---|
| MsgType = 3 |
| TxMsgID = 9708011030 |
| TxFaxNo = 03 - ???? - ???? |

| RxFaxNo = 06 - ??? - ???? |
|---|
| DIS = 00C200 |
| CompCode = 0 |
| PageRecSts = 0C |

FIG. 12

IMAGE DESCRIPTION FORMAT

| NUMBER | CONTENT | KEYWORD | VALUE |
|---|---|---|---|
| 1 | CAPABILITY EXCHANGE KEYWORD | | image / ITUFax |
| 2 | MESSAGE TYPE | MsgType | |
| 3 | TRANSMISSION MESSAGE ID | TxMsgID | |
| 4 | RESPONSE MESSAGE ID | RspMsgID | |
| 5 | TRANSMISSION FACSIMILE NUMBER | TxFaxNo | |
| 6 | RECEPTION FACSIMILE NUMBER | RxFaxNo | |
| 7 | COMPLETION CODE | CompCode | |
| 8 | PAGE RECEPTION STATUS | PageRecSts | |
| 9 | T. 30 SIGNAL | SIGNAL NAME | FIF OF T. 30 |

IMAGE COMMUNICATION SYSTEM USING ELECTRONIC MAIL AND CONTROL METHOD THEREFOR

BACKGROUND OF THE INVENTION

The present invention relates to an image communication system using an electronic-mail apparatus which delivers messages, documents and the like via a communication network.

Conventionally, an image file attached to a message can be transmitted by utilizing an electronic-mail system. However, in this electronic-mail system, a transmitting side sends an image file in a format selected by the transmitting side to a receiving side, on the premise that the receiving side can handle the image file.

Accordingly, the receiving side often fails to process the image file attached to the received E-mail (electronic mail). Each time such trouble occurs, an operator of the receiving side has to inform the transmitting side that the receiving side cannot handle the image file attached to the received E-mail by using a telephone or by transmitting a reply E-mail (hereinafter referred to as a "process failure notification") to the transmitting side. Further, an operator of the receiving side has to request an operator of the transmitting side to change the format of the image file and retransmit the E-mail to which the image file of the changed format is attached.

On the other hand, the operator of the transmitting side has to change the format of the image file in response to the request from the receiving side, regenerate the E-mail to which the image file of the changed format is attached, and retransmit the E-mail. Further, even when the transmitting side receives a processing-failure notification, if the cause of the processing failure is unknown, the transmitting side cannot take any measure to cope with the problem. Further, when the receiving side tries to return an unprocessed image file to the transmitting side, if the image file has a large amount of information, the transmission causes load on the network.

It is possible to examine the image file processing capability of the receiving side apparatus prior to E-mail communication, then attach an image file in a format corresponding to the processing capability to an E-mail and transmit the E-mail. However, to examine the image-file processing capability of the receiving side apparatus by using an E-mail protocol, a special E-mail protocol is required, and general E-mail communicability might be lost due to such special protocol. Further, in this case, the system must be greatly changed.

SUMMARY OF THE INVENTION

The present invention has its object to provide an image communication system using electronic mail, capable of checking image-file processing capability of a receiving apparatus, generating an image file corresponding to the processing capability and transmitting the converted image file, without substantial system change, and a control method for the system.

Another object of the present invention is to provide an image-file communication system using electronic mail, where, if a received E-mail cannot be processed, a receiving side notifies its processing capability to a transmitting side such that the transmitting side is clearly informed of processing necessary for retransmission and can easily perform image file conversion necessary for retransmission, and a control method for the system.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a schematic diagram showing an example of the Image Description of a facsimile transmission message of the embodiment;

FIG. 9 is a schematic diagram showing an example of the Image Description of a capability request message of the embodiment;

FIG. 10 is a schematic diagram showing an example of the Image Description of a capability response message of the embodiment;

FIG. 11 is a schematic diagram showing an example of the Image Description of a image-processing confirmation message of the embodiment; and FIG. 12 is a schematic diagram showing the format of data written in the Image Description.

DETAILED DESCRIPTION OF THE PREFERRED EMBODIMENT

Hereinbelow, the construction, operation and advantages of image file communication system as a preferred embodiment of the present invention will be described in detail in accordance with the accompanying drawings.

Figure 1:
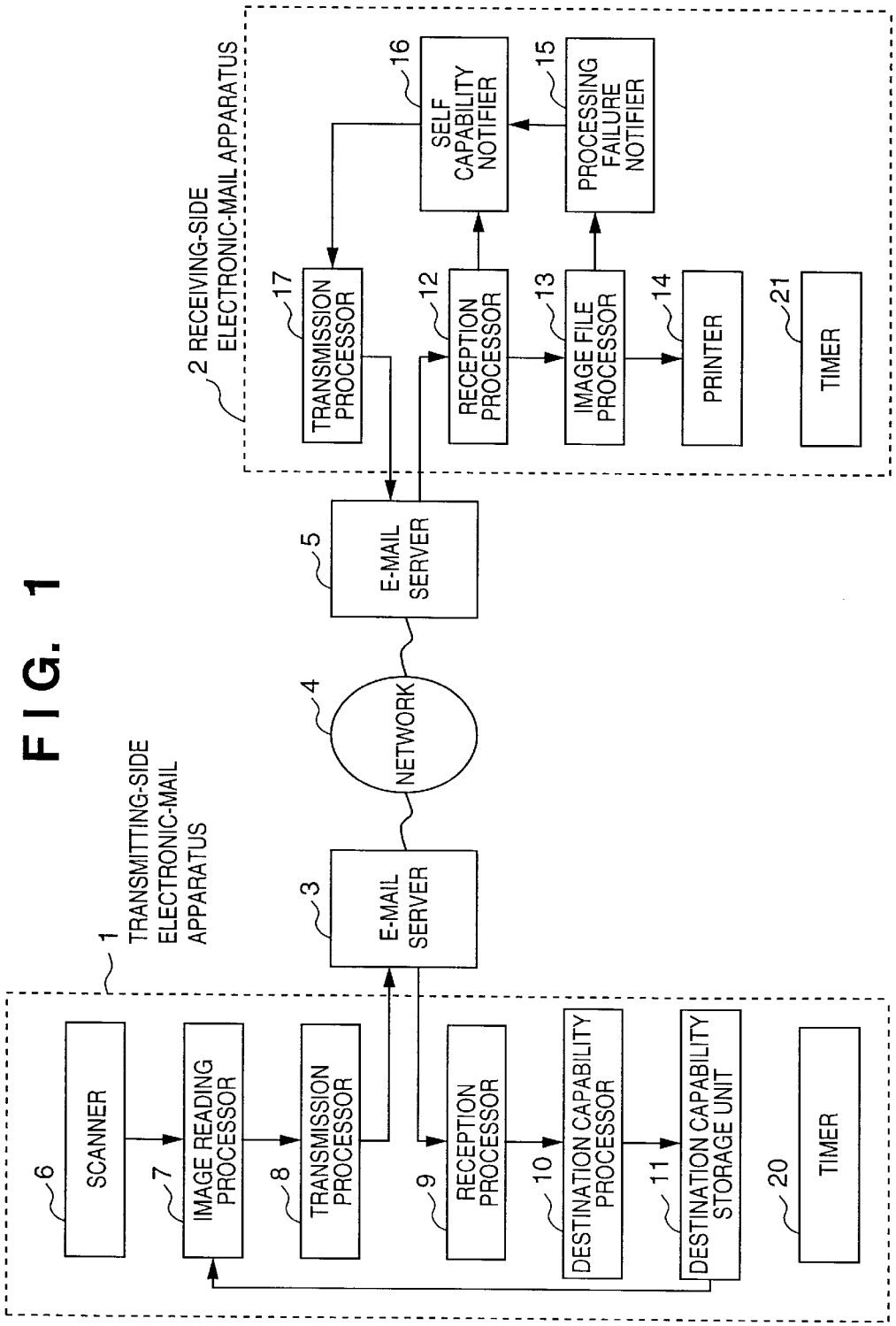
FIG. 1 is a block diagram showing the construction of an electronic-mail communication system according to an embodiment of the present invention.

First, the construction of the overall system of the embodiment will be described with reference to FIG. 1. In FIG. 1, an electronic-mail apparatus 1 is a transmitting-side apparatus which sends an image, and an electronic-mail apparatus 2 is a receiving-side apparatus which receives an image. An E-mail server 3 performs mail transmission/reception of the transmitting-side apparatus 1. An E-mail server 5 performs mail transmission/reception of the receiving-side apparatus 2. A network 4 is a communication network such as an Internet and carries an E-mail between the E-mail servers 3 and 5.

The transmitting-side electronic-mail apparatus 1 has a scanner 6 which reads an original, an image reading processor 7 which encodes the read image, converts the coded image as an image file and generates a message included in the image file, a transmission processor 8 which transmits an E-mail to the E-mail server 3 by using SMTP protocol, a reception processor 9 which receives an E-mail from the E-mail server 3, a destination capability processor 10 which judges destination capability information on the capability of a destination apparatus received by E-mail and processes the information (the processing of the destination capability processor 10 will be referred to as "destination capability processing"), a destination capability storage unit 11 for storing destination capability information in correspondence with a destination apparatus, and reading the destination capability information in accordance with the destination apparatus, and a timer 20 which performs various time measuring operations.

The receiving-side electronic-mail apparatus 2 has a reception processor 12 which receives an E-mail from the E-mail server 5, an image file processor 13 which extracts an image file from an E-mail and decodes the image file, a printer 14 which print-outputs an image, a processing failure notifier 15 which generates an error notification message if an image file cannot be processed by the image file processor 13, a self capability notifier 16 which notifies the capability of the apparatus 2 by an E-mail, a transmission processor 17 which transmits an E-mail to the E-mail server 5, and a timer 21 which performs various time measuring operations.

The outline of overall operation in the system having the above construction will be described. First, an image read by the scanner 6 of the transmitting-side electronic-mail apparatus 1 is converted by the image reading processor 7 into an image file. Then the transmission processor 8 generates a transmission E-mail to which the image file is attached, and delivers the E-mail to the E-mail server 3 as a nearest E-mail server by using SMTP protocol. The E-mail server 3 delivers the E-mail via the network 4 to the E-mail server 5 connected to the destination apparatus. The E-mail server 5 sends the E-mail to the receiving side electronic-mail apparatus 2.

The SMTP is a protocol used between the transmitting-side electronic-mail apparatus and the E-mail servers, and between the E-mail servers. As described above, the E-mail is transmitted by using the SMTP on the network 4, but if the destination apparatus does not support the SMTP protocol, i.e., is not a SMTP server, then the E-mail can not be received to the destination apparatus. The function of SMTP server is generally installed to an UNIX™ server or Windows NT™ server, but is not installed in a user terminal. Therefore, the user terminal retrieves the E-mail from the nearest server by using a protocol, such as POP. In the present embodiment, the transmitting-side electronic-mail apparatus 1 and the receiving-side electronic-mail apparatus 2 are capable of using the SMTP protocol upon mail transmission/reception.

The E-mail, send from the E-mail sever 5 to the receiving-side electronic-mail apparatus 2, is delivered to the reception processor 12. The reception processor 12 performs image processing on the E-mail, and if no trouble occurs, the image file is print-outputted by the printer 14 of the receiving-side apparatus 2. An image-processing confirmation message is generated by the processing failure notifier 15, and information on the capability of the receiving-side apparatus 2 is added to the message by the self capability notifier 16. The transmission processor 17 attaches the message to an E-mail and transmits the E-mail to the E-mail server 5.

As a result of the image processing by the reception processor 12, if trouble occurs, the processing failure notifier 15 generates a processing-failure notification message having a transmission message ID of the failed E-mail and information on the cause of processing failure. The transmission processor 17 attaches the processing-failure notification message to an E-mail, and transmits the E-mail to the E-mail server 5 by using SMTP protocol.

The E-mail server 5 delivers the E-mail via the network 4 to the E-mail server 3 connected to the destination apparatus. The E-mail server 3 sends the E-mail to the transmitting-side apparatus 1. The E-mail is delivered to the reception processor 9. The reception processor 9 interprets the E-mail, and performs necessary processing.

Note that in the above construction, the main functions of the transmitting-side apparatus 1 and those of the receiving-side apparatus 2 are clearly discriminated from each other. However, normally, the apparatuses have common functions.

Further, although general constituents such as a CPU and a memory which are basic functions of the E-mail apparatus are not shown in FIG. 1, the apparatuses include these constituents, and the respective operations to be described below are executed by the CPU in accordance with a control program stored in the memory.

Further, as the control program executed by the CPU, as well as a programs stored in a dedicated memory (ROM) in advance, a program stored in various storage media such as a floppy disk, a hard disk and a CD-ROM can be used. The program stored in the storage medium is read by a reading device (not shown) of the electronic-mail apparatus, and interpreted and executed by the CPU.

Next, the structure of an image file attached to an E-mail will be described.

The format of an image file used in the present embodiment is a TIFF file format, and an image is stored in a format defined by TIFF (a file format for a PC (personal computer) developed by Aldus Corporation; details of the TIFF format will be omitted in this embodiment).

In a TIFF file, in its Image Description, a comment on an image can be added. In the comment field, data necessary for capability exchange is stored in the form of ASCII, where a string which ends with Null can be stored, with a 270 (10EH) tag.

Hereinbelow, newly defined portions of the TIFF file according to the embodiment of the present invention will be described.

First, as shown in FIG. 12, in the format of Image Description, a value "image/ITUFax" indicative of capability exchange data is set as a keyword at the head of the format.

(1) Message Type

Message types are as follows:

MsgType=0: facsimile transmission

MsgType=1: capability request

MsgType=2: capability response

Msgtype=3: image-processing confirmation (2) Transmission Message ID

A transmission message ID is an identification number assigned by a transmitting apparatus. The transmission message ID is represented as:
TxMsgID=a decimal number with a maximum of ten digits
(3) Response Message ID A response message ID is a message ID to a polling request. The response message ID is represented as:
RspMsgID=a decimal number with on a maximum of ten digits
(4) Transmission Facsimile Number A transmission facsimile number (telephone number) indicates a facsimile number of the transmitting apparatus. The transmission facsimile number is stored when the message type is "1". The transmission facsimile number is represented as:
TxFaxNo=actual facsimile number
(5) Reception Facsimile Number A reception facsimile number indicates a facsimile number of a receiving apparatus. The reception facsimile number is stored when the message type is "2". The reception facsimile number is represented as:
RxFaxNo=actual facsimile number
(6) Completion Code A completion code is used to transmit a communication result. The completion code is stored when the message type is "3". "CompCode=0" means "normal status", while "CompCode=1" means "error".
(7) Page Reception Status A page reception status indicates whether or not reception pages have been normally received. The page reception status is a binary data. If the value is "0", the status is "normal", while if the value is "1", the status is "error". The status is represented by a hexadecimal octet unit, and is sent as an ASCII code. The head octet LSB indicates the first page.

For example, in case of PageRecSts=0C, the status is "00001100" in binary representation, meaning that an error has occurred in the reception of the third and fourth pages.
(8) T.30 Signal A signal in the ITU-T Reccommendation T.30 is used as a keyword. The content of FIF in hexadecimal representation follows after a sign "=". The T.30 signal is represented as octet-unit LSB-first data.

For example, in case of DIS=00C200, the bit "10", "15" and "16" of the FIF of the DIS are "1".

In the frame structure as described above, an image file is transferred by E-mail at the following steps 1 to 4.
(Step 1)

At the transmitting-side apparatus 1, before an original is read, the transmitting-side apparatus 1 transmits a capability request with the message type "1" by E-mail to examine the reception capability of the receiving-side apparatus 2. At this time, the capability of the transmitting-side apparatus 1 is sent as "DIS=". FIG. 9 shows an example of the contents described in the Image Description in a capability request TIFF file.
(Step 2)

The receiving-side apparatus 2 receives the capability request by E-mail, and transmits a capability response with the message type "2" indicative of the reception capability of the receiving-side apparatus by E-mail. The information "DIS=" sent from the transmitting-side apparatus is stored into the destination capability storage unit (not shown as the constituent of the receiving-side apparatus 2) in correspondence with the destination apparatus. FIG. 10 shows an example of the contents described in the Image Description in a capability response TIFF file.

(Step 3)

The transmitting-side apparatus 1 receives the capability response, then reads the original within the range of the capability designated by the receiving-side apparatus, and transmits image data as an attachment file of an E-mail. The information "DIS=" sent from the receiving-side apparatus 2 is stored into the destination capability storage unit 11 in correspondence with the destination apparatus. FIG. 8 shows an example of the contents described in the Image Description in an facsimile transmission TIFF file.
(Step 4)

The receiving-side apparatus 2 receives the facsimile transmission message by E-mail, then print-outputs the image file, and transmits an image-processing confirmation message to the transmitting-side apparatus 1. The transmitting-side apparatus 1 receives the image-processing confirmation message, and generates a delivery confirmation report. The information "DIS=" sent from the receiving-side apparatus 2 is stored in correspondence with the destination apparatus.

FIG. 11 shows an example of the contents described in the Image Description in an image-processing confirmation TIFF file.

Next, the operation of the electronic-mail apparatus having the above construction will be described with reference to the flowcharts of FIGS. 2 to 7. Note that the following operations are performed by the CPU's in the respective electronic-mail apparatuses 1 and 2.

First, the operation upon image transmission in the transmitting-side apparatus 1 to store the capability information of the receiving-side apparatus 2 will be described.

Figure 2:
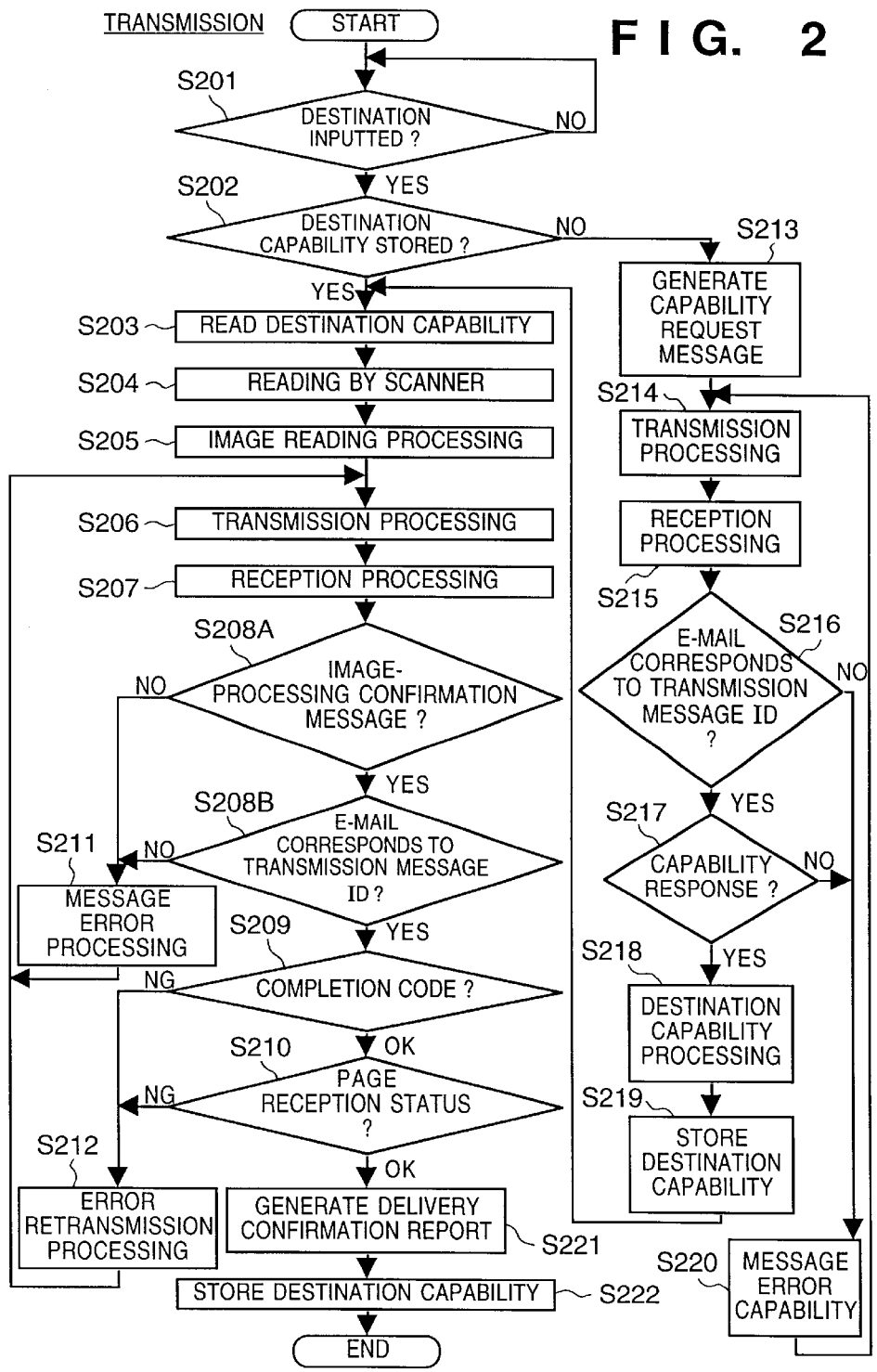
FIG. 2 is a flowchart showing an image transmission operation of an electronic-mail apparatus according to the embodiment.

In FIG. 2, in the transmitting-side apparatus 1, when a destination is inputted at step S201, it is examined at step S202 whether or not the capability data of the inputted destination is stored in the destination capability storage unit 11. If the capability data is not stored, a capability request message is generated at step S213, in accordance with the procedure in the flowchart of FIG. 5.

Figure 5:
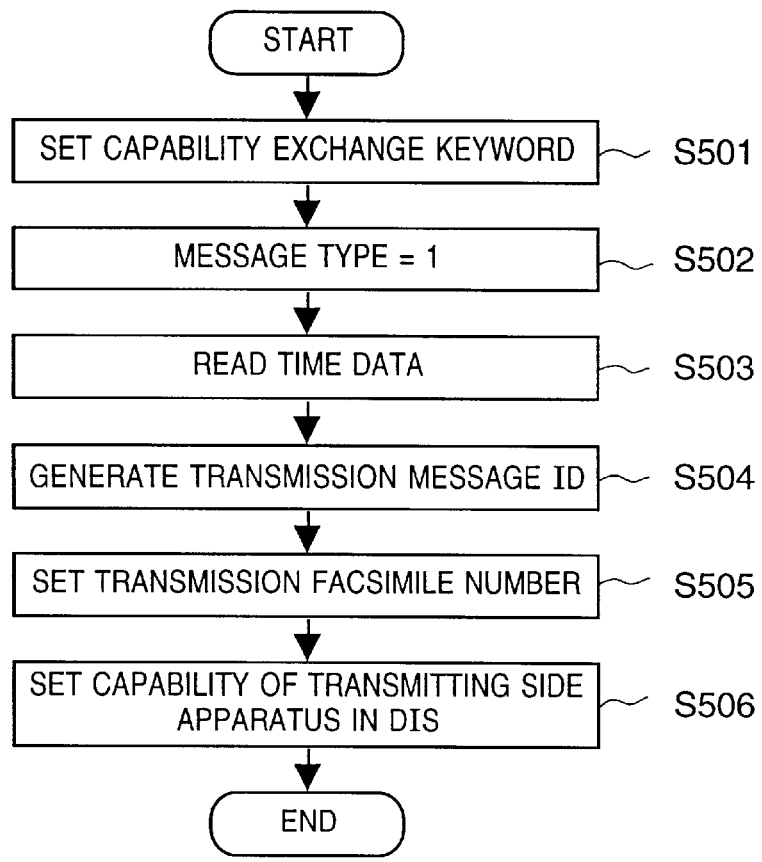
FIG. 5 is a flowchart showing operation for generating an Image Description of a capability request message according to the embodiment.

In FIG. 5, the capability exchange keyword is set at step S501, and the message type is set to "1" (capability request) at step S502. At step S503, time data is read from the timer 20, and at step S504, the transmission message ID is set from "year-month-day-hour-minute-second" of the time data. At step S505, the transmission facsimile number is set, and at step S506, the capability of the transmitting-side apparatus 1 is converted into "DIS=" FIF information with the T.30 DIS signal as a keyword, and added as transmission mail information to the message.

Next, a transmission mail is transmitted at step S214. At this time, the capability request message generated at step 213 is sent as an E-mail by the transmission processor 8 to the E-mail server 3, and transferred via the network 4, to the E-mail server 5 connected to the destination apparatus.

Figure 3:
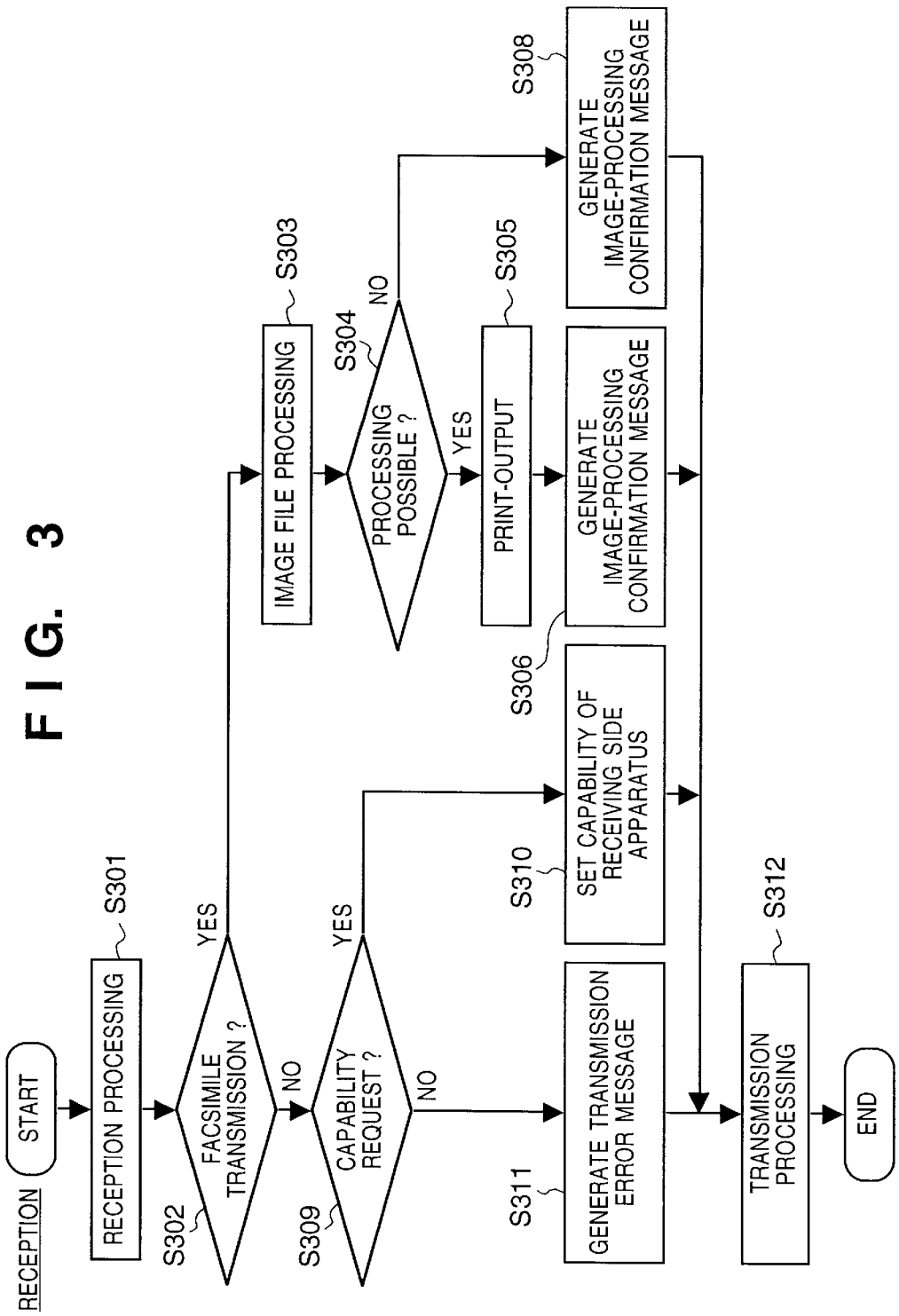
FIG. 3 is a flowchart showing an image reception operation of the electronic-mail apparatus according to the embodiment.

At the receiving-side apparatus 2, the E-mail is processed in accordance with the procedure in the flowchart of FIG. 3.

In FIG. 3, at step S301, the E-mail is read from the E-mail server 5 by the reception processor 12, and the message type in the Image Description of the E-mail is examined.

Figure 6:
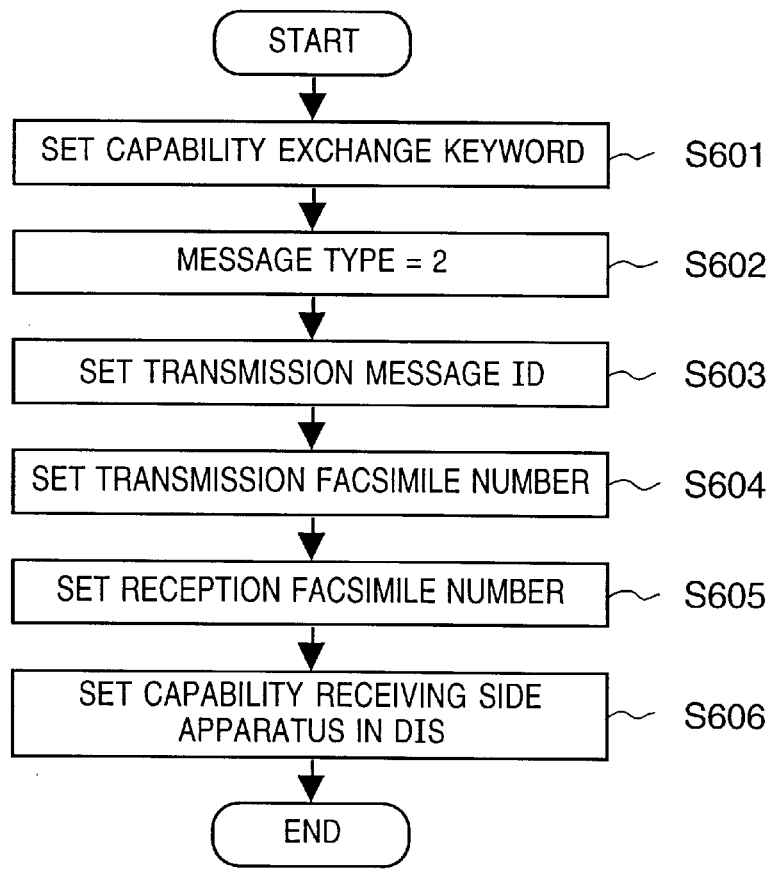
FIG. 6 is a flowchart showing operation for generating an Image Description of a capability response message according to the embodiment.

If the message is not a facsimile transmission message (NO at step S302) but is a capability request message (YES at step S309), a capability response message is generated at step S310, in accordance with the procedure in the flowchart of FIG. 6 to generated an Image Description capability response message. If the message is not a capability request message (NO at step S309), a transmission error message is generated at step S311. The transmission error message is attached to an E-mail and sent to the E-mail server 5 by the transmission processor 17 at step S312, and transferred via the network 4 to the E-mail server 3 connected to the destination apparatus.

Referring to FIG. 6, in the Image Description format as shown in FIG. 12, the above-described capability exchange keyword is set (S601), and the message type (=2 (capability response)), the transmission message ID, the transmission facsimile number, and the reception facsimile number are sequentially set (S602–S605). Further, the capability data of the receiving-side apparatus is added to the FIF information of the DIS signal (S606). Thus, the capability response message is completed.

At step S312, the capability response message is attached to an E-mail and sent to the E-mail server 5 by the transmission processor 17, and transferred via the network 4 to the E-mail server 3 connected to the destination apparatus.

Thereafter, in the transmitting-side apparatus 1, the E-mail is processed in accordance with the procedure in the flowchart of FIG. 2. At step S215, the E-mail is received by the reception processor 9 of the transmitting-side apparatus 1. If it is determined at step S216 that the E-mail corresponds to the transmission message ID in the capability request, and if it is determined at step S217 that the E-mail is a capability response message, the destination capability processing is performed by the destination capability processor 10 at step S218. Then, the destination capability data is stored in the destination capability storage unit 11 at step S219.

The destination capability storage unit 11 has destination capability storage directories for respective destination apparatuses. The destination capability data is stored in a destination capability storage directory corresponding to the destination apparatus.

Note that if it is determined in step S216 that the transmission message ID's do not coincide or it is determined at step S217 that the E-mail is not a capability response message, message error processing is performed at step S220. Then the process returns to step S214 to perform retransmission processing.

Next, the operation of the transmitting-side apparatus 1 to read an image, designate a destination and transmit image data and the operation of the receiving-side apparatus 2 to print-output will be described.

In FIG. 2, at the transmitting-side apparatus 1, when the destination is inputted at step S201, it is examined at step S202 whether or not destination capability data corresponding to the destination is stored in the destination capability storage unit 11. If the destination capability data exists, it is read at step S203, and at step S204, an image is read by the scanner 6 in accordance with the destination capability data. Then image data is encoded by the image reading processor 7 at step S205, and converted into an image file.

Figure 4:
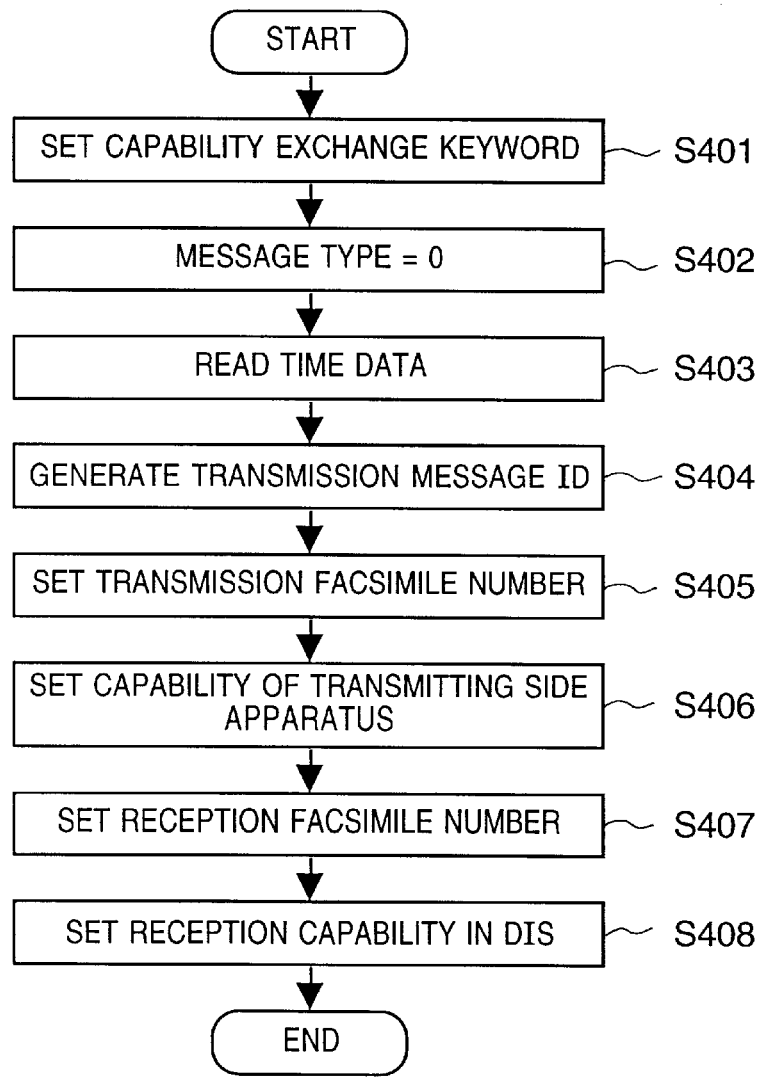
FIG. 4 is a flowchart showing operation for generating an Image Description of a facsimile transmission message according to the embodiment.

Then, a facsimile transmission message is generated in accordance with the flowchart of FIG. 4. First, in the Image Description format as shown in FIG. 12, the above-described capability exchange keyword is set (S401), then, the message type is set to "0" (facsimile transmission) (S402).

Next, time data is read from the timer 20 (S403), and a transmission message ID is set from "year-month-day-hour-minute-second" of the time data (S404). Then, the transmission facsimile number is set (S405), and the capability data of the transmitting-side apparatus 1 is added to the FIF information of the DIS signal (S406).

Further, the reception facsimile number is set (S405), and the capability data of the receiving-side apparatus 2 is added to the FIF information of the DIS signal (S406).

The facsimile transmission message generated in accordance with the procedure in the flowchart of FIG. 4 is sent as an E-mail by the transmission processor 8 to the E-mail server 3 at step S206. Then the E-mail is transferred via the network 4 to the E-mail server 5 connected to the destination apparatus.

Thereafter, in the receiving-side apparatus 2, the E-mail is processed by the reception processor 12 in accordance with the procedure in the flowchart of FIG. 3.

In FIG. 3, the message type in the Image Description in the E-mail is examined by the reception processor 12 at step S301. If it is determined at step S302 that the E-mail is a facsimile transmission message, the image-file processor 13 extracts and decodes the image file at step S303, and it is determined at step S304 whether or not the image file can be processed. If the image file can be processed, the image is print-outputted by the printer 14 at step S305. Then, at step S306, an image-processing confirmation message indicative of the completion of processing is generated in accordance with the procedure in the flowchart of FIG. 7, and the message is sent to the transmitting-side apparatus 1.

Figure 7:
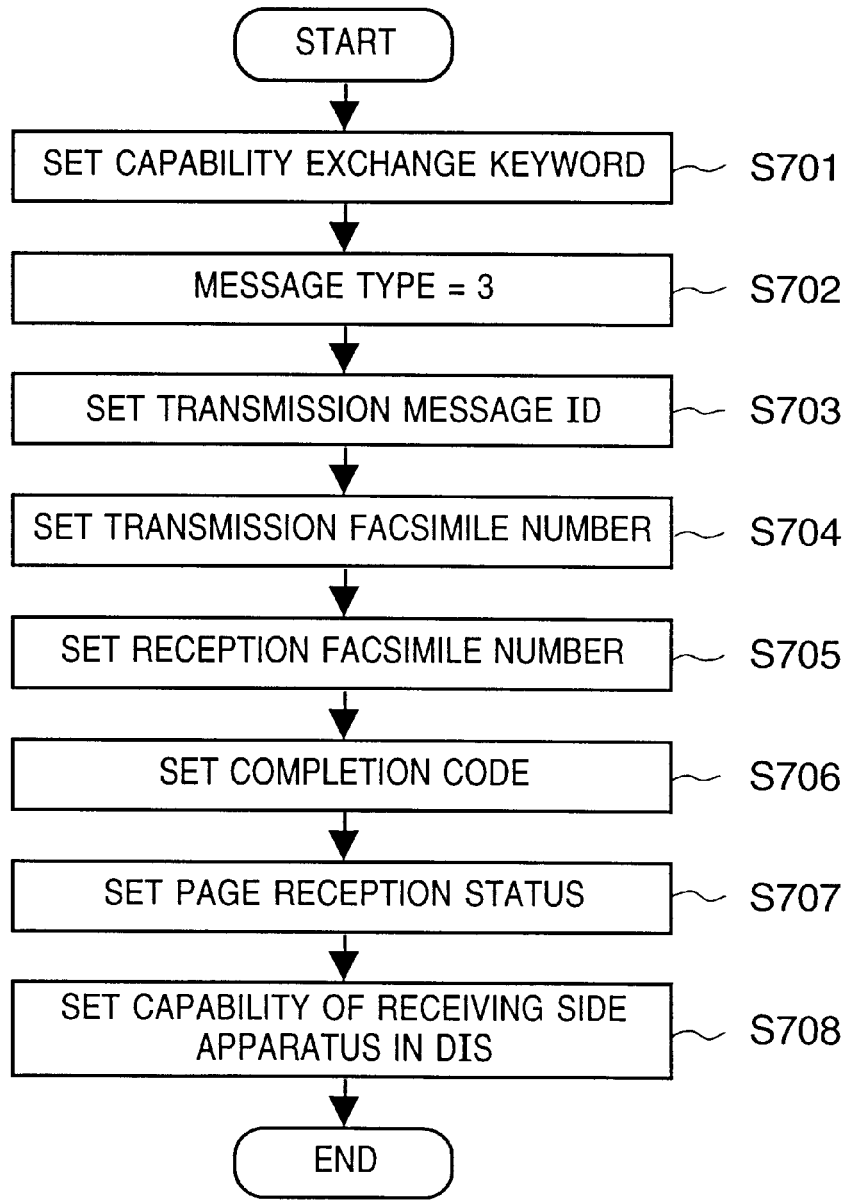
FIG. 7 is a flowchart showing operation for generating an Image Description of a image-processing confirmation message.

In FIG. 7, first, in the Image Description format as shown in FIG. 12, the above-described capability exchange keyword is set (S701), then, the message type is set to "3" (image processing confirmation) (S702).

Next, the transmission message ID, the transmission facsimile number, the reception facsimile number, the completion code (CompCode=0), and the page reception status are sequentially set (S703–S708). Then, the capability data of the receiving-side apparatus 1 is added to the FIF information of the DIS signal (S708).

Further, at step S304 in FIG. 3, if the image file cannot be processed, the processing-failure notification processing is performed at step S308. An image-processing confirmation message indicating that the processing has not been normally completed is generated in accordance with the procedure in the flowchart of FIG. 7. The message is transmitted to the transmitting-side apparatus 1. This message is generated by setting the completion code to "1" (CompCode=1) indicative of an image processing error at step S706.

The image-processing confirmation message is attached to an E-mail and sent to the E-mail server 5 by the transmission processor 17 at step S312, and transferred via the network 4 to the E-mail server 3 connected to the destination apparatus.

Thereafter, at the transmitting-side apparatus 1, the E-mail is processed in accordance with the procedure in the flowchart of FIG. 2. That is, the E-mail is received by the reception processor 9 of the transmitting-side apparatus 1 (S207). If it is determined that the E-mail corresponds to the transmission message ID (S208A), and it is determined that the E-mail is an image-processing confirmation message (S208B), the completion code and the page reception status are checked (S209 and S210), then a delivery confirmation report is generated (S221). Then, the destination capability processing is performed, and the destination capability data is stored (S222).

Note that if it is determined at step S208A that the E-mail is not an image-processing confirmation message or it is determined at step S208B that the E-mail does not correspond to the transmission message ID, message error processing is performed at step S211, and the process returns to step S206 to repeat the transmission processing. Further, if appropriate value is not detected at steps S209 and S210, error retransmission processing is performed at step S212, and the process returns to step S206 to repeat the transmission processing.

As described above, in the transmitting-side apparatus 1, the destination capability is examined and the capability is stored in advance, and an image file corresponding to the destination apparatus is transmitted. Thus, the functions of the transmitting-side apparatus 1 are fully utilized, and the reliability of the processing in the receiving-side apparatus 2 can be improved.

Further, if a received E-mail cannot be processed the situation is notified with clarified cause of processing-failure.

Note that in the above example, the TIFF format is employed as an image file format, however, other file formats such as FlashPix, EXiF and JFIF may be used.

As described above, according to the present invention, the electronic-mail apparatus has a function to add information necessary for image-file reception processing to an image file attached to an E-mail and transmit the E-mail. By this construction, the apparatus generates an image file which can be processed by the receiving-side apparatus in accordance with the capability of the receiving-side apparatus and transmits the image file. This realizes smooth E-mail transmission.

In a case where an image file attached to a transmission E-mail cannot be processed in the receiving-side apparatus, "notification with clarified cause of processing failure" is made, further, the "capability of receiving-side apparatus" and the "image file that cannot be processed" are informed to the transmitting-side apparatus. Accordingly, the transmitting-side apparatus converts the image file to an image file corresponding to the capability of the receiving-side apparatus, further, if necessary, performs editing or the like on the image file, and retransmits the file. This realizes smooth E-mail transmission.

Further, as a part of an image file attached to an E-mail is used to notify image-file processing capability information to the receiving-side, the present invention is realized in a conventional system only by changing an image-file processing program. That is, the notification of image-file processing capability can be made without greatly changing the system.

Further, as the image-file processing capability is notified by using a comment field of an image file format, it is not necessary to greatly change the image-file processing program. The notification of processing capability information can be made by a simple program change such as addition of a program for interpreting the information in the comment field and processing the capability information.

As many apparently widely different embodiments of the present invention can be made without departing from the spirit and scope thereof, it is to be understood that the invention is not limited to the specific embodiments thereof except as defined in the appended claims.

What is claimed is:

1. An image communication system including at least a first communication terminal and a second communication terminal, said first communication terminal comprising:
first electronic-mail transmission means for transmitting a first electronic mail with a capability request to inquire into a processing capability of said second communication terminal;
first electronic-mail reception means for receiving a second electronic mail from said second communication terminal;
discrimination means for discriminating whether or not the second electronic mail is an electronic mail with a capability response corresponding to the capability request;
a destination capability storage means for storing destination capability information corresponding to a destination address based on the capability response included in the second electronic mail;
reading means for reading an image; and
conversion means for converting the image read by said reading means to an image file based on the destination capability information stored by said destination capability storage means,
wherein said first electronic-mail transmission means transmits a third electronic mail to which the image file is attached, to said second communication terminal, and said second communication terminal comprising:
second electronic-mail reception means for receiving the first electronic mail with the capability request from said first electronic-mail transmission means; and
second electronic-mail transmission means for transmitting the second electronic mail with the capability response corresponding to the capability request,
wherein said second electronic-mail reception means receives the third electronic mail to which the image file is attached.

2. The image communication system according to claim 1, wherein the capability response is included in an image file attached to the second electronic mail.

3. The image communication system according to claim 1, wherein the capability response includes information on image-file processing capability.

4. The image communication system according to claim 1, wherein said second communication terminal comprises image processing means for processing the image file which is attached to the third electronic mail received by said second electronic-mail reception means, in accordance with the capability.

5. The image communication system according to claim 1, wherein if said second communication terminal receives the first electronic mail with the capability request from said first communication terminal, said second electronic-mail transmission means automatically transmits the second electronic mail with the capability response to said first communication terminal.

6. The image communication system according to claim 4, wherein said second electronic-mail transmission means further transmit a fourth electronic mail with information notifying a result of processing on the received image file.

7. The image communication system according to claim 6, wherein said third electronic-mail includes capability information of said first communication terminal.

8. An electronic-mail apparatus comprising:
electronic-mail transmission means for transmitting an electronic mail with a capability request to inquire into a processing capability of a destination apparatus;
electronic-mail reception means for receiving an electronic mail from an electronic-mail server;
discrimination means for discriminating whether or not the electronic mail received by said electronic-mail reception means is an electronic mail with a capability response corresponding to the capability request;
destination capability storage means for storing destination capability information corresponding to a destination address based on the capability response included in the received electronic mail;
reading means for reading an image; and
conversion means for converting the image read by said reading means to an image file based on the destination capability information stored by said destination capability storage means, wherein said electronic-mail transmission means further transmits an electronic mail to which the image file is attached, to the destination apparatus.

9. The electronic-mail apparatus according to claim 1, said electronic-mail transmitting means further transmits an electronic mail with process-result information notifying the result of processing on the received image file by said processing means.

10. The electronic-mail apparatus according to claim 9, wherein said electronic-mail transmitting means further transmits an electronic mail with both capability information on image processing capability of said apparatus and the process-result information.

11. An electronic-mail apparatus comprising:
   electronic-mail reception means for receiving an electronic mail with a capability request from a transmitting-side apparatus;
   discrimination means for discriminating whether or not the electronic mail received by electronic-mail reception means is an electronic mail with a capability request;
   electronic-mail transmitting means for transmitting an electronic mail with a capability response corresponding to the capability request,
   wherein the electronic mail with the capability response includes information for identifying the capability request;
   destination capability storage means for storing destination capability information corresponding to a destination address based on the capability request included in the received electronic-mail; and
   electronic-mail attachment reception means for receiving an electronic-mail attachment, said electronic-mail attachment formatted by the transmitting-side apparatus according to capability information from the capability response.

12. The electronic-mail apparatus according to claim 9, wherein the capability response information is added to a comment-adding field in format data area of an image file attached to the electronic mail.

13. The electronic-mail apparatus according to claim 9, wherein the capability response includes information on image processing capability of said apparatus.

14. The electronic-mail apparatus according to claim 9, wherein if said electronic-mail reception means receives the electronic mail with the capability request, said electronic-mail transmission means automatically returns an electronic mail accompanied by information on capability of said apparatus as the capability response.

15. The electronic-mail apparatus according to claim 9, further comprising:
   said electronic-mail reception means for receiving an electronic mail to which an image file is attached;
   image processing means for processing the received image file.

16. A communication method for performing transmission/reception of an electronic mail between first and second communication terminals, comprising:
   a capability request transmission step of transmitting an electronic mail with the capability request from said first communication terminal to said second communication terminal;
   a capability request reception step of receiving the electronic mail with the capability request from said first communication terminal in said second communication terminal;
   a capability response transmission step of transmitting an electronic mail with a capability response, corresponding to the capability request, from said second communication terminal to said first communication terminal, the electronic mail with a capability response including information for identifying the capability request;
   an electronic mail reception step of receiving an electronic mail from said second communication terminal in said first communication terminal;
   discrimination step of discriminating whether or not the electronic mail received at said electronic-mail reception step is the electronic mail with the capability response corresponding to the capability request;
   a destination capability storage step, in said first communication terminal for storing destination capability information corresponding to a destination address based on the capability response included in the received electronic mail;
   an image-file generation step, in said first communication terminal, of generating an image file in a format based on the destination capability information stored by said destination capability storage means; and
   an image-file transmission step for transmitting an electronic mail, to which the generated image file is attached, from said first communication terminal to said second communication terminal.

17. A computer-readable memory containing a control program for performing transmission/reception of an electronic mail, said program including:
   capability request transmission process procedure codes for transmitting an electronic mail with a capability request to a destination apparatus;
   an electronic-mail reception process procedure codes for receiving an electronic mail;
   discrimination process procedure codes for discriminating whether or not the electronic mail received by said electronic-mail reception process is the electronic mail with the capability response corresponding to the capability request;
   destination capability storage process procedure codes for storing destination capability information corresponding to a destination address based on the capability response included in the received electronic mail;
   image-file generation process procedure codes for generating an image file in a format based on the destination capability information stored by said destination capability storage means; and
   image-file transmission process procedure codes for transmitting an electronic mail, to which the generated image file is attached, to the destination apparatus.

18. An electronic-mail apparatus comprising:
   electronic-mail transmission means for transmitting an electronic mail with a capability request to inquire a capability of a destination apparatus;
   electronic-mail reception means for receiving an electronic mail from the destination apparatus;
   discrimination means for discriminating whether or not the electronic mail received by said electronic-mail reception means is the electronic mail with a capability response corresponding to the capability request;
   destination capability storage means for storing destination capability information corresponding to a destination address based on the capability response included in the received electronic mail; and generation means for generating an image file in a format based on the destination capability information stored by said destination capability storage means and extracted from the received electronic mail, wherein said electronic-mail transmission means transmits an electronic mail, to which the generated image file is attached, to the destination apparatus.

19. An electronic-mail apparatus comprising:

electronic-mail transmission means for transmitting an electronic mail with a capability request to inquire a capability of a destination apparatus;

electronic-mail reception means for receiving an electronic mail from the destination apparatus;

discrimination means for discriminating whether or not the electronic mail received by said electronic-mail reception means is the electronic mail with a capability response corresponding to the capability request;

destination capability storage means for storing destination capability information corresponding to a destination address based on the capability response included in the received electronic mail; and conversion means for converting a format of an image file in accordance with the destination capability information stored by said destination capability storage means and extracted from the received electronic mail, before transmitting the image file to the destination apparatus; and wherein said electronic-mail transmission means transmits an electronic mail, to which the image file is attached, to the destination apparatus.

20. A communication method comprising:

a first electronic-mail transmission step of transmitting an electronic mail with a capability request to inquire a capability of a destination apparatus;

an electronic-mail reception step of receiving an electronic mail from the destination apparatus;

a discrimination step of discriminating whether or not the electronic mail received by said electronic-mail reception step is the electronic mail with a capability response corresponding to the capability request;

a destination capability storage step of storing destination capability information corresponding to a destination address based on the capability response included in the received electronic mail; and a generation step of generating an image file in a format based on the destination capability information stored in said destination capability storage step and extracted from the received electronic mail; and a second electronic-mail transmission step of transmitting an electronic mail, to which the generated image file is attached, to the destination apparatus.

21. A communication method comprising:

a first electronic-mail transmission step of transmitting an electronic mail with a capability request to inquire a capability of a destination apparatus;

an electronic-mail reception step of receiving an electronic mail from the destination apparatus;

a discrimination step of discriminating whether or not the electronic mail received by said electronic-mail reception step is the electronic mail with a capability response corresponding to the capability request;

a destination capability storage step of storing destination capability information corresponding to a destination address based on the capability response included in the received electronic mail; and a conversion step of converting a format of an image file in accordance with the destination capability information stored in the destination capability storage step and extracted from the received electronic mail, before transmitting the image file to the destination apparatus; and a second electronic-mail transmission step of transmitting an electronic mail, to which the image file is attached, to the destination apparatus.

22. A computer-readable memory containing a control program for an electronic-mail apparatus, said program including:

electronic-mail transmission process procedure codes for transmitting an electronic mail with a capability request to inquire a capability of a destination apparatus;

electronic-mail reception process procedure codes for receiving an electronic mail from the destination apparatus;

discrimination process procedure codes for discriminating whether or not the electronic mail received by said electronic-mail reception step is the electronic mail with a capability response corresponding to the capability request;

destination capability storage process procedure codes for storing destination capability information corresponding to a destination address based on the capability response included in the received electronic mail; and generation process procedure codes for generating an image file in a format based on the destination capability information stored by said destination capability storage process and extracted from the received electronic mail, wherein by said electronic-mail transmission process procedure codes an electronic mail, to which the generated image file is attached, is transmitted to the destination apparatus.

23. A computer-readable memory containing a control program for an electronic-mail apparatus, said program including:

electronic-mail transmission process procedure codes for transmitting an electronic mail with a capability request to inquire a capability of a destination apparatus;

electronic-mail reception process procedure codes for receiving an electronic mail from the destination apparatus;

discrimination process procedure codes for discriminating whether or not the electronic mail received by said electronic-mail reception process procedure is the electronic mail with a capability response corresponding to the capability request; and destination capability storage process procedure codes for storing destination capability information corresponding to a destination address based on the capability response included in the received electronic mail; and conversion process procedure codes for converting a format of an image file in accordance with the destination capability information stored by said destination capability storage process and extracted from the received electronic mail, before transmitting the image file to the destination apparatus, wherein by said electronic-mail transmission process procedure codes an electronic mail, to which the image file is attached, is transmitted to the destination apparatus.

* * * * *